United States Patent Office 2,913,700
Patented Nov. 17, 1959

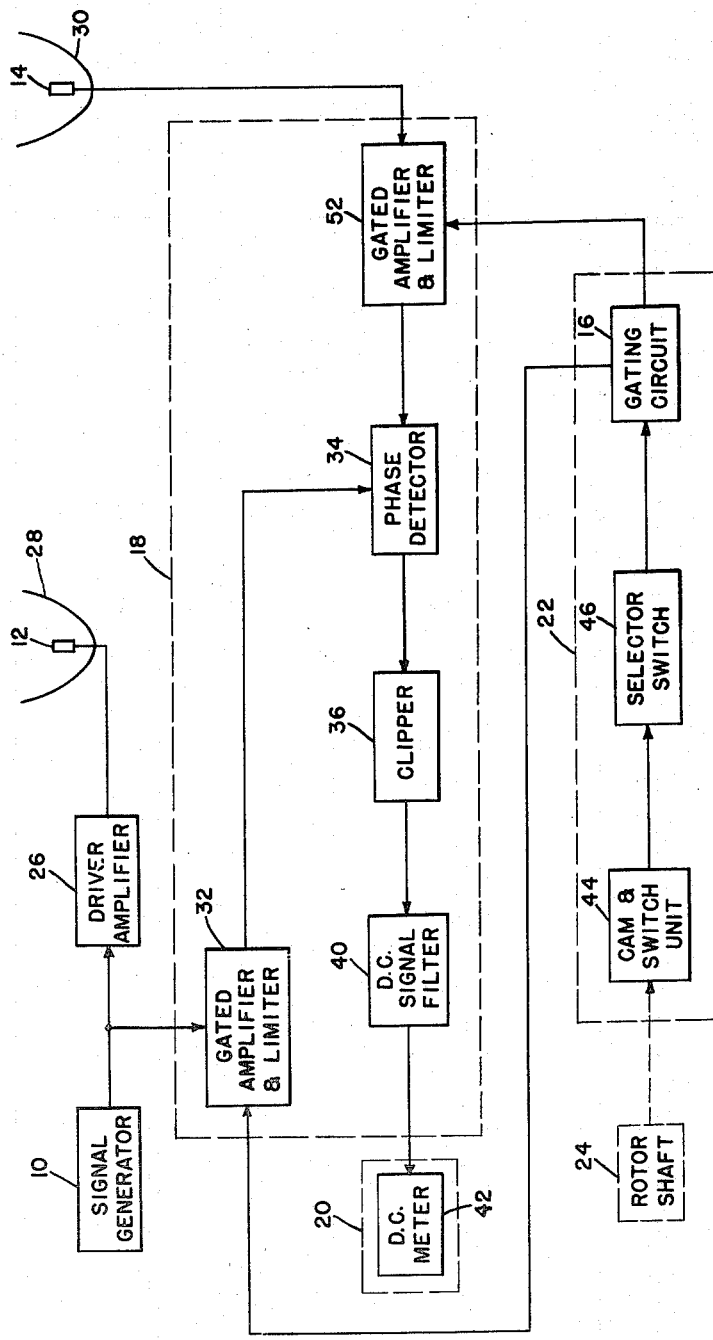

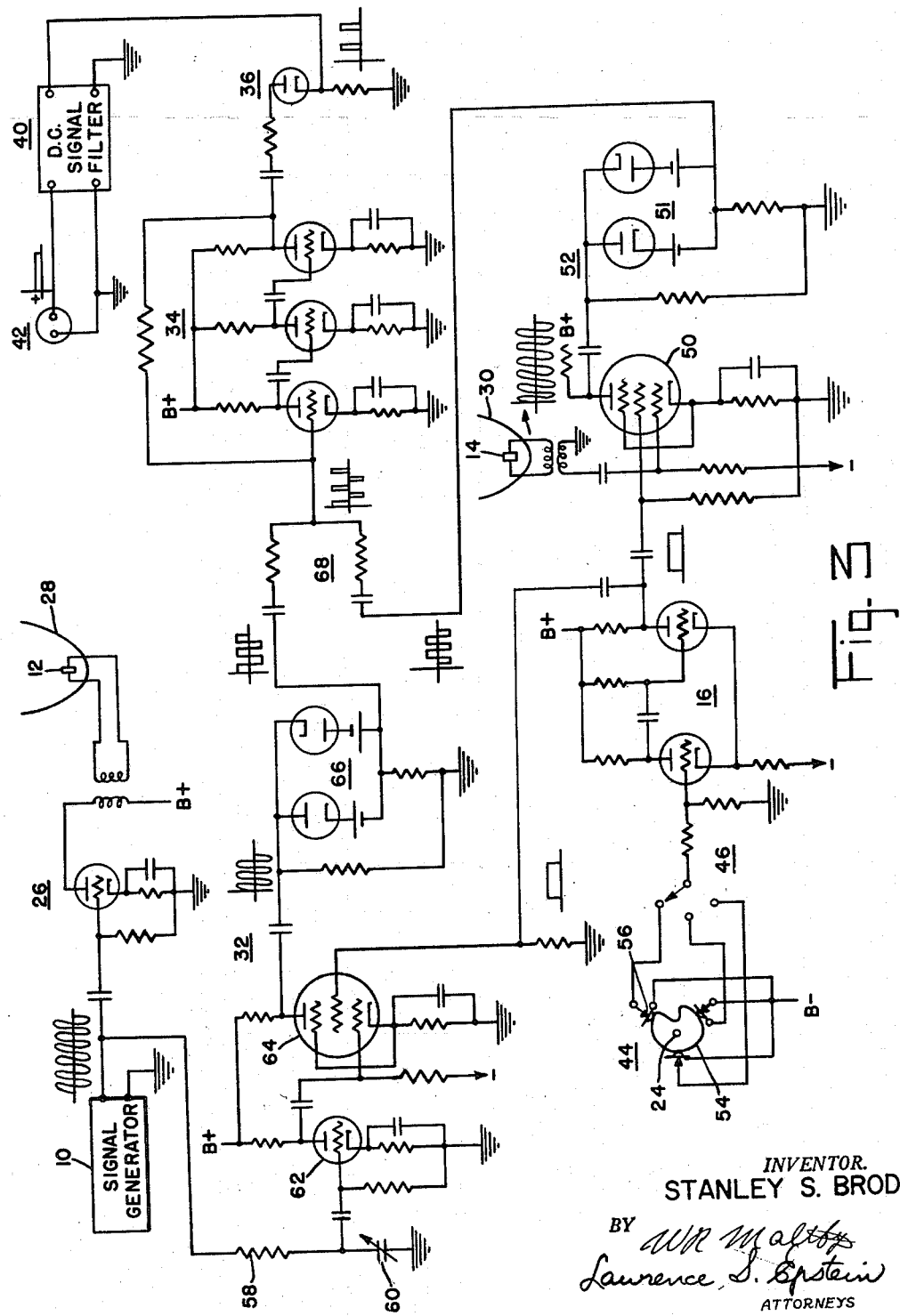

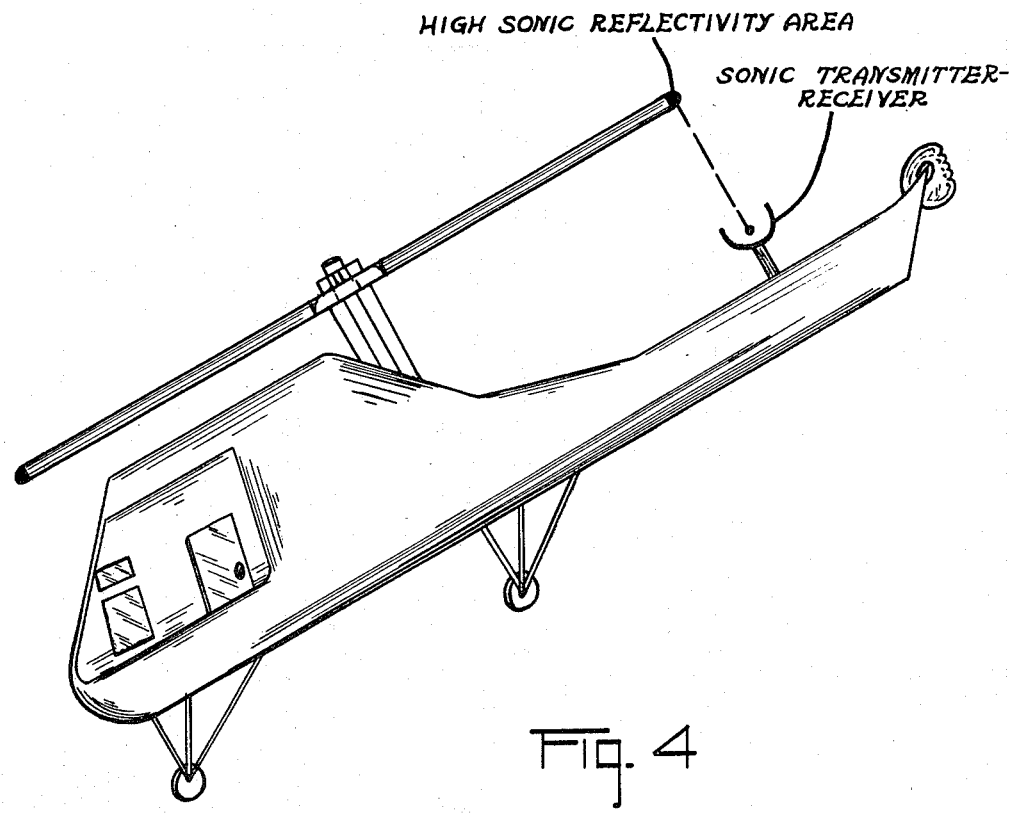

2,913,700

SUPERSONIC DEVIATION-MEASURING APPARATUS

Stanley S. Brody, Bayside, N.Y.

Application May 31, 1956, Serial No. 588,586

9 Claims. (Cl. 340—1)

(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for determining the deviations of rotating elements from a reference plane and especially to a supersonic device employable for such determination.

The present invention has particular, although not exclusive, utility in the field of aviation and will therefore be described with respect to one of its applications in this field.

When all blades of the rotor of a helicopter do not rotate in the same plane, vibrations are established which may damage the aircraft. The severity of the vibrations depends upon the amount of vertical deviation of each blade from a reference plane, which may, for convenience, be the plane of rotation of one of the blades.

The usual method of aligning the blades so that all will rotate in the same plane consists in determining deviations between blades by chalking the tip of each blade with a differently colored chalk and rotating the blades so that the tips strike and mark a white cloth positioned at right angles to the plane of rotation of the blades. The spaces between the differently colored marks on the white cloth indicate the vertical deviations between the planes of rotation of the rotor blades and adjustments of the blades may be effected accordingly.

This method is subject to errors on windy days resulting from the tipping of the rod which supports the flag. This is especially true aboard aircraft carriers. In addition, the use of the supporting rod creates an accident hazard since the possibility exists that the rod may fall into the rotor. Most important of all, this method cannot be employed while the aircraft is in flight.

The objects and advantages of the present invention are accomplished in a typical embodiment by utilizing a supersonic wave to measure a deviation in the position of the rotational plane of a rotating part, such as a helicopter rotor blade, from a reference plane which may be established by another rotating part, such as a second rotor blade.

An electrical wave is generated and converted to a supersonic wave which is directed against the whirling rotor blades. The reflected supersonic wave is received and reconverted to an electrical wave.

The phase of the reflected electrical wave is now compared with that of the generated electrical wave, any difference in phase resulting from the distance travelled by the reflected wave. A D.C. voltage proportional to the phase difference is derived and applied to a meter calibrated in terms of distance.

The apparatus is synchronized with one rotor blade at a time and the meter reading of any given rotor blade may be used as the reference reading. The readings for the other blades are then compared with the reference reading and the blades are adjusted accordingly.

An object of this invention is to provide an efficient, reliable method and apparatus for determining displacement between the plane of rotation of a rotating member and a reference plane.

Another object is to provide an efficient, reliable method and apparatus for aligning rotating blades.

A further object is to provide a method and apparatus for aligning rotating blades, which method and apparatus are not subject to error due to adverse weather conditions.

Yet another object is to provide an efficient, reliable method and apparatus for determining the relative displacements of the rotor blades of the helicopter while the aircraft is in flight.

Other objects and many of the attendant advantages of this invention will be readily appreciated as the same becomes better understood by reference to the following detailed description when considered in connection with the accompanying drawings wherein:

Fig. 2 is a more detailed block diagram of an embodiment of the invention,

Fig. 3 is a schematic diagram of circuits which may be employed in the invention, and Fig. 4 is a general layout of the invention as it is installed on a helicopter.

In the drawings, similar reference characters refer to similar elements.

Figure 1:
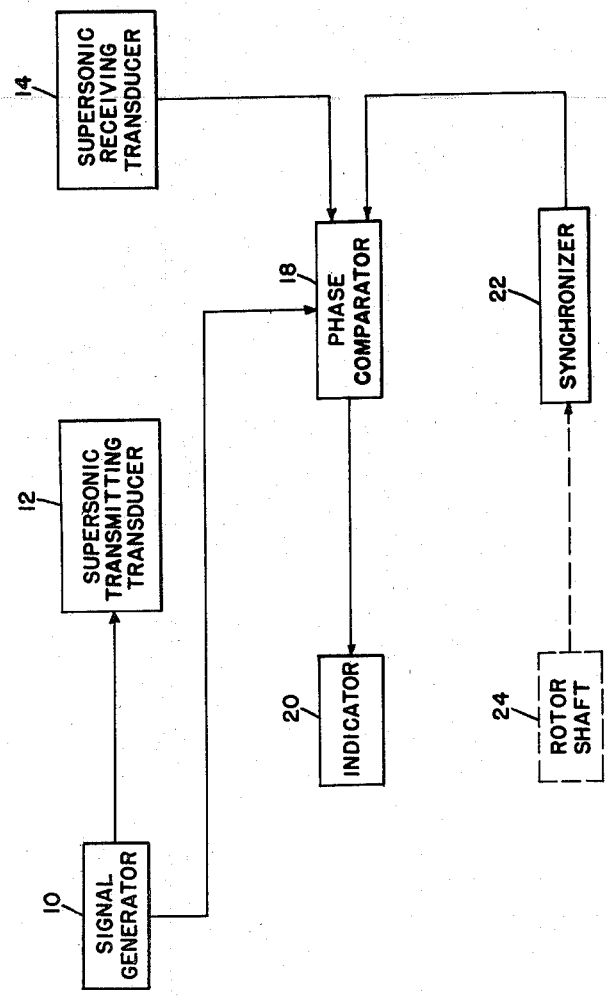
Fig. 1 is a simplified block diagram of the invention.

In Fig. 1, the invention is shown in simplified form. An electron signal generator 10 generates an electrical wave preferably of the order of 20,000 cycles, which is converted to a supersonic wave and directed against the rotating blades of the rotor of a helicopter by a supersonic transmitting transducer 12. The 20,000 cycle frequency is preferred because experience shows that the ordinary range of displacement between the rotor blades results in phase differences ranging up to about one cycle at such a frequency. It requires more complicated apparatus to work with phase differences greater than a cycle because of the repetitive nature of each cycle. Of course, higher frequency carriers AM or FM modulated by waves of the order of 20 kc. in frequency may also be employed, and thereafter demodulated to obtain the 20 kc. modulation frequency.

The transducer 12 may be any device which converts electrical energy to sound energy, such as a crystal of Rochelle salt or ammonium salt.

Referring to Figure 4, a small area of material of high sonic reflectivity, such as a metal plate, surrounded by material of low sonic reflectivity, such as absorbent felt, is affixed in identical locations on the lower surface of each rotor blade, preferably near the tip thereof. The supersonic wave is directed against and reflected from these small areas. The fabricated reflective areas are highly desirable for optimum reflection from the rotor blades, although they may be dispensed with, if necessary.

The reflected wave is received by a supersonic receiving transducer 14, which may be of the same type as the transmitting transducer 12, and converted into an electrical wave which is applied to a phase comparator 18.

The output of the signal generator 10, in addition to being applied to the supersonic transmitting transducer 12, is also applied to the phase comparator 18, where it is used as the reference signal with which the reflected wave is compared.

The output of the phase comparator 18, which is a D.C. signal having a value proportional to the phase difference of the input waves, is applied to an indicator 20, preferably a meter calibrated in terms of displacement units.

A synchronizer 22, operatively associated with the rotor blades or shaft 24, permits the operator to select the particular blade from which a reflection is desired. The synchronizer 22 controls the operation of the phase comparator 18, allowing it to operate only when the received signals come from the selected rotor blade.

The generalized blocks of Fig. 1 are broken down in Fig. 2 to show their component units, also in block form. Thus, the phase comparator 18 may comprise gated amplifier and limiter circuits 32 and 52, a phase detector 34, a clipper 36, and a D.C. signal filter 40. The indicator 20 is preferably a D.C. meter 42. The synchronizer 22 consists of a cam and switch unit 44 operated by the rotor shaft 24, a selector switch 46 and a gating circuit 16.

Circuits which may be employed in the embodiment shown in Fig. 2 are illustrated in schematic form in Fig. 3, except for the signal generator 10 and the D.C. signal filter 40. Significant wave forms are also indicated.

Any conventional electronic audio oscillator giving an output of approximately 20 kc., such as a Hewlett-Packard audio signal generator, may be used as a signal generator 10. The D.C. signal filter 40 may consist of any standard low pass filter, such as the General Radio Company's type 830-c.

The output of the signal generator 10 may be amplified, if necessary, by a driver amplifier 26, which may be any conventional electronic amplifying stage or stages such as a triode stage with transformer coupling to the transmitting transducer 12.

The transmitting transducer 12 is located at the focal point of a parabolic reflector 28, the purpose of which is to form the supersonic wave into a narrow, highly directional beam. This permits the beam to be directed only against the small reflective area on each rotor blade and also prevents spill-over between the transmitting and receiving transducers.

The output of the signal generator 10 is also applied to a gated amplifier and limiter 32 through an adjustable phase shifter, which may comprise a resistive element 58 in series with an adjustable capacitive element 60. The phase of the wave may thus be shifted to compensate for any phase shift inherent in the apparatus as a whole and for the phase shift in the supersonic wave at the reflective surface.

The first stage 62 of the gated amplifier and limiter 32 is a conventional amplifying stage. The second stage 64 is a gated amplifier comprising a pentode biased below cut-off by returning the control grid to a suitable negative voltage. The second stage 64 is caused to conduct by a rectangular positive gating pulse applied to the screen grid which, in the absence of a gating pulse, is at ground potential. The output of the gated amplifier 64 is limited at top and bottom by a conventional biased diode clipping stage 66.

The reflected signal is received by the receiving transducer 14, which is located at the focal point of another parabolic directional reflector 30, converted to an electrical signal and applied to the control grid of another gated amplifier 50. Both gated amplifiers 64 and 50 are gated by pulses from the same stage, a conventional one-shot multivibrator stage 48 producing positive output pulses.

If necessary, the input to, or the output from, the gated amplifier 50 may be further amplified. It then is applied to a biased diode clipping stage 51. The outputs of both biased diode clipping stages 51 and 66 are applied to a phase detector 34, which may simply comprise a signal adding network 68 and a conventional negative feedback amplifier 34, for example, although other and more complex phase detectors may be employed. The reason that the generated and reflected waves are formed into rectangular waves before being compared is that comparing such waves results in greater accuracy and output than that obtainable from a comparison of sine waves. Also, limiting the tops and bottoms of the waves insures that only phase differences, and not amplitude, will affect the output of the phase detector 34.

The combination in the adding network 68 of the output signals of the diode clipping stages 66 and 51 results in a signal which is a series of positive and negative pulses each having a duration proportional to the phase differences of the added waves. A diode clipper 36 permits only the positive pulses to be applied to the D.C. signal filter 40 which smoothes the pulses into a D.C. signal. The strength of this D.C. signal is, of course, proportional to the phase difference between the transmitted and reflected signals. If this signal is too weak to afford a good indication on the meter 42, any standard D.C. amplifier may be inserted between the clipper 36 and the D.C. signal filter 40.

The D.C. signal is applied to a D.C. meter 42 with a long time constant. The meter 42 is preferably directly calibrated in terms of displacement units, such as inches.

One means which may be utilized for synchronization is to attach a cam 54 to the rotor shaft 24. The cam 54 is circular in shape, except for an indentation which may coincide physically with the position of one of the rotor blades. Several microswitches 56 contact the periphery of the cam 54. The number of microswitches and the angular displacement between them correspond respectively to the number and the angular displacement between the rotor blades. Thus, the cam and switch unit 44 illustrated may be used with a three-bladed rotor, each blade making an angle of 120° with its neighbor.

Each microswitch applies a negative voltage to a different contact on a multi-position selector switch 46, the contact arm of which is coupled to the gating circuit 16, which may be a one-shot multivibrator. The multivibrator 16 thus is biased beyond cut-off until the indentation on the cam 54 rotates to the positon of the selected microswitch 56 and allows it to open, thereby breaking the biasing circuit. The multivibrator stage 16 produces a positive gating pulse whenever the indentation on the cam 54 passes the selected microswitch 56. The time during which the gating pulse is being produced can, by proper positioning of the cam 54 and microswitches 56 and by proper adjustment of the peripheral size of the indentation, be made to approximately coincide with the time during which the transmitted supersonic wave is being reflected by the selected rotor blade, and, preferably, the gating pulse period should be made to overlap the reflection period both initially and finally. The apparatus is thus gated to operate when a specific selected rotor blade reflects the supersonic transmitted beam.

In operation, the apparatus may be carried in a helicopter and employed while the helicopter is airborn. The operator directs the supersonic beam against the rotor blades and takes preliminary readings for each one. He determines which blade is the highest and, using this blade as his reference, adjusts his phase adjustment control so that the indicator shows a zero reading.

Readings are then obtained for the other blades and the heights of these blades are adjusted when the helicopter lands. The heights of these blades and the reference blade should now be identical.

Obviously many modifications and variations of the present invention are possible in the light of the above teachings. It is therefore to be understood that within the scope of the appended claims the invention may be practiced otherwise than as specifically described.

I claim:

1. Apparatus for measuring the deviations of similarly situated areas on rotating elements from a similarly situated reference area on another rotating element comprising, in combination: means generating a supersonic signal; means directing said supersonic signal for reflection from said areas; means receiving said reflected signals; comparison means, connected in circuit with said receiving and said generating means, operable to compare the generated signal and the signal reflected from each said area and derive signals proportional to the amount of phase shift between said generated and reflected signals; synchronization means, connected to said comparison means and activated by the rotation of said rotating elements, said synchronization means being manually operable to select a desired rotating element and produce a synchronizing signal at the time said desired rotating element reflects said supersonic signal, said synchronizing signal causing said comparison means to operate for a predetermined period of time; and means, connected to said comparison means, indicating the amount of phase shift associated with each said desired rotating element.

2. Apparatus as set forth in claim 1, wherein said indicating means is calibrated in terms of units of distance.

3. Apparatus as set forth in claim 1, wherein said synchronization means comprises: cam and switch means, including a cam coupled to rotate with said rotating elements and a plurality of microswitches, each associated with a respective rotating element, said cam and switch means arranged to effect a change in potential whenever a rotating element reflects said supersonic signal; selector switch means, connected to said cam and switch means, said selector switch means being manually operable to select one of said microswitches; and electronic gating means, connected to said selector switch means, producing an output potential in response to the changes in potential effected by said cam and switch means.

4. Apparatus as set forth in claim 1, wherein said synchronization means comprises: an indented cam arranged to rotate with said rotating elements; a plurality of two-contact microswitches, each associated with a respective one of said rotating elements, said microswitches arranged to have their contacts successively opened by the indentation in said cam, and the geometrical pattern of said indentation and microswitches being such that opening of each microswitch occurs simultaneously with reflection of said supersonic signal from its associated rotating element; a multi-position selector switch having a movable contact, each position connected to the same contact on a respective microswitch; connection means for a source of biasing potential, said connection means being connected to all of said other contacts on said microswitches; and a one-shot electronic multivibrator having an input connected to said movable contact of said selector switch, said multivibrator arranged to produce an output pulse when said indentation in said cam opens the microswitch selected by said selector switch.

5. Apparatus for determining the deviations of similarly situated areas on rotating elements from a similarly situated reference area on another rotating element comprising, in combination: means generating an electric signal; means converting said electric signal into a supersonic signal; means directing said supersonic signal for reflection from said areas; means receiving said reflected supersonic signals; means reconverting said reflected supersonic signals into electric signals; comparison means, connected in circuit with said reconversion means and said generating means, operable to compare the generated signal and the reconverted signals to derive signals proportional to the amount of the phase shift between said generated and reflected signals; synchronization means, connected to said comparison means and activated by the rotation of said rotating elements, said synchronization means being manually operable to select a desired rotating element and produce a synchronizing signal at the time said desired rotating element reflects said supersonic signal, said synchronizing signal causing said comparison means to operate for a predetermined period of time; and means, connected to said comparison means, indicating the amount of phase shift associated with each said desired rotating element.

6. Apparatus as set forth in claim 5, wherein said selective comparison means includes means to compensate for phase shift betwen the generated and reflected signals caused by the inherent phase shift characteristic of said device and by the phase shift due to reflection of said supersonic signal.

7. Apparatus as set forth in claim 5, wherein said indicator means is calibrated in terms of units of distance.

8. A method for determining the deviations of similarly situated areas on rotating elements from a similarly situated reference area on another rotating element comprising the steps of: generating an electric wave; converting said electric wave into a supersonic wave; directing said supersonic wave for reflection from said areas; receiving the reflected supersonic wave; converting the reflected supersonic wave into an electric wave; distinguishing the electric wave reflected by the reference area from the waves reflected by the other areas; comparing the generated electric wave with the reflected electric wave from the reference area to determine the amount of phase shift between them; deriving an electric signal proportional to the amount of said phase shift; indicating the intensity of said phase shift signal; and repeating the aforesaid steps for each of the other rotating elements.

9. A method for determining the deviations of similarly situated areas on rotating elements from a similarly situated reference area on another rotating element comprising the steps of: generating an electric wave; converting said electric wave into a supersonic wave; directing said supersonic wave for reflection from said areas; receiving the reflected supersonic wave; converting the reflected supersonic wave into an electric wave; distinguishing the electric wave reflected by the reference area from the waves reflected by the other areas; comparing the generated electric wave with the reflected electric wave from the reference area to determine the amount of phase shift between them; deriving an electric signal proportional to the amount of said reference phase shift; indicating the intensity of said reference phase shift signal; zeroing the indication of said reference phase shift signal; repeating the aforesaid steps for each of the other rotating elements with the exception of zeroing the indications of the phase shift signals.

References Cited in the file of this patent

UNITED STATES PATENTS

| | | |
|---|---|---|
| 2,147,810 | Alford | Feb. 21, 1939 |
| 2,228,024 | Abrahams | Jan. 7, 1941 |
| 2,710,959 | Pierce | Jan. 14, 1955 |